L. S. BACHE, DEC'D.
M. S. BACHE, EXECUTRIX.
SELF LUBRICATING VALVE FACE.
APPLICATION FILED APR. 28, 1916.
1,234,715. Patented July 31, 1917.
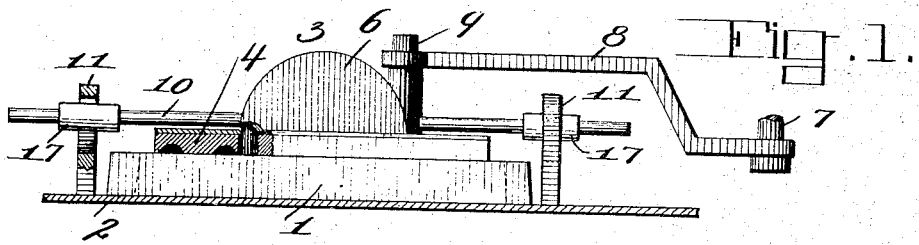
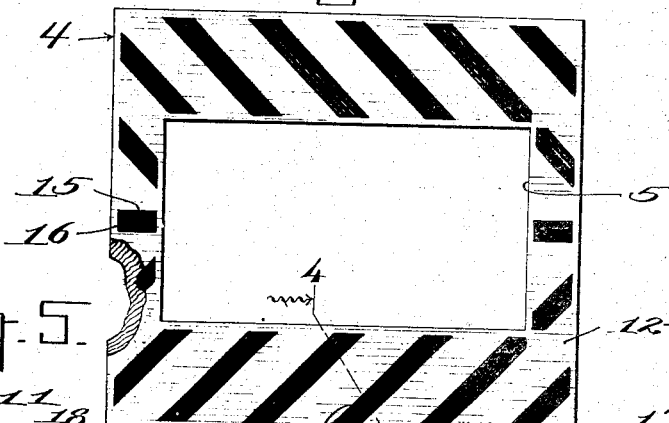
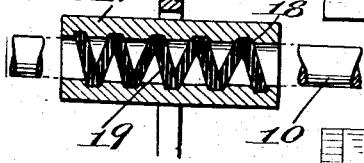
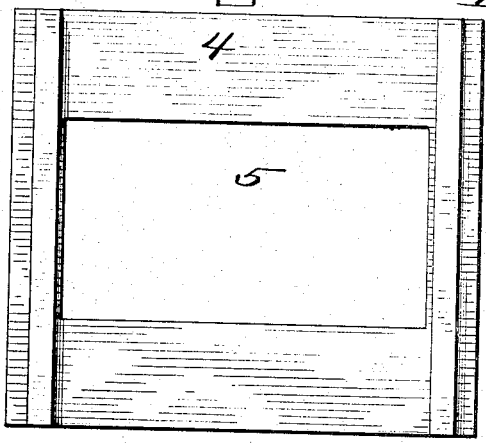
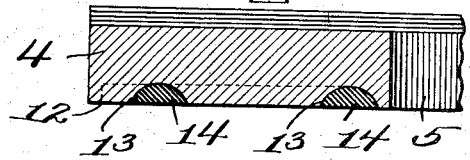
Witnesses
Inventor
Leigh S. Bache
By
James L. Norris,
Attorney

UNITED STATES PATENT OFFICE.

LEIGH S. BACHE, OF BOUNDBROOK, NEW JERSEY; MABEL S. BACHE, EXECUTRIX OF SAID LEIGH S. BACHE, DECEASED, ASSIGNOR TO BOUND BROOK OIL-LESS BEARING COMPANY, OF BOUNDBROOK, NEW JERSEY, A CORPORATION OF NEW JERSEY.

SELF-LUBRICATING VALVE-FACE.

1,234,715.   Specification of Letters Patent.   Patented July 31, 1917.

Application filed April 28, 1916. Serial No. 94,185.

*To all whom it may concern:*

Be it known that I, LEIGH S. BACHE, a citizen of the United States, residing at Boundbrook, in the county of Somerset and State of New Jersey, have invented new and useful Improvements in Self-Lubricating Valve-Faces, of which the following is a specification.

My present invention relates to valves, and particularly to sliding valves of the type commonly employed in gas meters.

Gas meters, as commonly constructed, contain sliding valves which control the flow of the gas to and from the measuring devices. These valves are sealed within the body of the meter casing and hence they are inaccessible for lubrication, except by removal of the meter from service and unsealing and removal of the top of the meter casing. Experience has demonstrated that after meters have been in service for a while, these sliding valves, which have no provision for lubricating them, develop considerable friction relatively to their seats, the valves then having a tendency to lift or tilt from their seats, thereby greatly reducing the efficiency and accuracy of the meter, and, moreover, the friction and uneven motion of the valves on their seats is the cause of noise which is often objectionable, this noise being particularly pronounced in the operation of meters of the larger sizes, such as are used where a considerable amount of gas is consumed for commercial purposes.

The primary object of the present invention is to provide a valve of this character which is self-lubricating whereby, when the valve is installed in the meter, it provides for and maintains effective lubrication for the valve for a relatively long or indefinite period, thereby reducing friction between the valve and its seat to a minimum, avoiding tilting or lifting of the valve relatively to the valve seat and preventing noise, to the ends that the efficiency and accuracy of the meter are greatly increased.

Another object of the invention is to provide self-lubricating bushings to coöperate with the guiding stem of the valve, thereby removing substantially another source of friction and noise.

To these and other ends, the invention consists in certain improvements, and combinations and arrangements of parts, all as will be hereinafter more fully described, the novel features being pointed out particularly in the claims at the end of the specification.

In the accompanying drawing:—

Figure 1 is a side elevation of a sliding valve and its valve seat of the type commonly used in gas meters, the same being provided with the self-lubricating features embodying the present invention.

Fig. 2 is a view of the lower or working face of the valve showing the preferred disposition of the lubricating medium therein.

Fig. 3 is a top plan view of the valve.

Fig. 4 represents an enlarged section of the valve on the line 4—4 of Fig. 2, and Figs. 5 and 6 are enlarged sectional views taken in different planes and showing one of the bushings for the guiding stem of the valve.

Similar parts are designated by the same reference characters in the several views.

While the present invention is applicable to sliding valves generally where it is desirable or necessary to provide lubrication therefor, the invention is particularly applicable to gas meters where, as stated, the valves are sealed or inclosed within the body of the meter casing and are inaccessible for lubrication. According to the present invention, a self-lubricating valve is provided which maintains effective lubrication for the valve for an indefinite period, the lubricating medium being contained in the working face of the valve or in the working face of the valve seat, or the lubricating medium may be contained in the working faces of both the valve and its seat. In the present instance, the lubricating medium is shown as contained in the face of the valve, and the preferred arrangement or disposition of the lubricating medium relatively to the valve face is shown. It is to be understood, however, that the invention is not limited to the particular construction shown, as equivalent constructions and arrangements are contemplated and will be included within the scope of the claims.

In the present instance, 1 designates the valve seat for one of the valves of a gas meter, this valve seat being mounted on a septum 2 which is above the gas-measuring bellows or equivalent measuring devices.

Usually two valves are provided to control the flow of gas to and from the gas-measuring bellows, the seat of each valve having ports which admit and exhaust, respectively, the gas relatively to the measuring bellows. The valve 3 which coöperates with each valve seat comprises, generally, a relatively flat plate 4 which is slidable or reciprocable on the upper face of the seat. The valve has a port 5 which is inclosed by a casing 6. Motion is imparted to the valves usually from a rotating shaft, the shaft having a crank-pin 7 thereon, and each valve being connected to this crank-pin by a pitman or connecting rod 8 the opposite end of which coöperates with a pin or projection 9 which extends upwardly from the valve. The valve is properly guided relatively to its seat by a guiding stem 10 which has ends projecting beyond opposite ends of the valve, and these ends of the stem coöperate with loops or posts 11 which are fixed to the septum 2 or to any other suitable stationary part of the meter structure.

According to the present invention, a lubricating medium is combined with the valve or its seat in such a way as to be distributed properly upon the sliding or coöperating faces of the valve and its seat. This lubricating medium is of a character which will maintain its lubricating properties for an indefinite period after the meter is put into service. Preferably, a solid or substantially solid lubricant such, for example, as graphite, is employed as the lubricating medium, and the lubricating medium is contained in grooves or pockets in one of the working faces, these grooves or pockets being so disposed as to insure proper distribution of the lubricating medium to reduce friction and wear to a minimum, yet they do not interrupt the continuity of the metal surface of the face containing them in order that a gas-tight or leak-proof joint for the gas will be maintained between the working faces of the valve and its seat.

In the construction shown, the working face 12 of the valve is formed with pockets 13, these pockets being shown in the form of grooves, and bodies of solid or substantially solid lubricant, preferably graphite, 14 are contained in dense or compact form in the grooves. The bodies of lubricant fill the grooves or pockets flush with the working face 12 of the valve, and hence these bodies of lubricant form, in effect, portions of the working face of the valve. In the preferred form of grooves, as shown, the grooves in the face 12 toward one end of the valve have a pitch in one direction while the grooves in the working face of the valve and toward the opposite end thereof have a pitch in a reverse direction, producing, in effect, what might be termed a "herringbone" arrangement. The reverse pitches of the lubricant-containing grooves cause these grooves to extend obliquely relatively to the line of movement of the valve. Preferably, the pitch of each set of grooves equals an angle of 45° to the line of movement of the valve and, as shown, the inner end of each groove overlaps, relatively to the line of movement of the valve, the outer end of the next adjacent groove. Because of this arrangement of the grooves, the lubricant contained in the several grooves will cover the entire area of the seat engaged by the valve, the lubricating bodies having, in effect, a lapping relation with one another. Midway of the length of the valve where the two sets of reversely extending grooves meet may be provided grooves 15, these grooves being at opposite sides of the valve and preferably arranged perpendicular to the direction of motion of the valve. A body of lubricant 16 fills each of these side grooves. In order to maintain continuity of the metal face of the valve and thereby avoid leakage of gas between the working faces of the valve and its seat, all of the grooves terminate short of the margin of the port 5 and the periphery of the valve face. This arrangement leaves the working face of the valve ungrooved at the ends of the grooves, and these ungrooved portions of the working face will provide the necessary gas-tight joints to prevent leakage.

By providing the working face of the valve or its seat with lubricant-containing grooves or pockets, in accordance with the present invention, and filling these grooves or pockets with a lubricating medium in substantially solid form such, for example, as graphite, these working faces of the valve and its seat when installed and in operation within the meter will be efficiently lubricated, and this lubrication will be maintained for an indefinite period of time, the graphite or other lubricating medium being of a character which will maintain its lubricating properties indefinitely and being in a form which will enable it to form, in effect, a part of the working face of the valve or its seat. By providing and maintaining efficient lubrication for the valve and its seat, friction and wear of these working faces are reduced to a minimum, and sticking and consequent tilting or lifting of the valve from its seat are avoided, with the results that the efficiency of the meter is greatly increased and greater accuracy in the measuring of the gas is attained. Noise which has heretofore been found objectionable in the operation of meters as usually constructed is also eliminated. In order to further reduce the friction incident to the operation of the valve, self-lubricating bushings 17 are provided to coöperate with the ends of the valve-guiding stem 10. These bushings are provided interiorly with suitable grooves or pockets 18 which are filled with a lubricating medium 19 such, for example, as graphite or other lubricant in solid form. The bushings may be held in position relatively to the loops or post 11 in different ways. For example, opposite sides of each bushing may be formed with grooves 20 in which the opposite sides of the respective loop or post 11 may engage so as to hold the bushing stationary during the reciprocations of the valve and yet not interfere with a proper seating of the valve.

I claim as my invention:—

1. A working face for a sliding valve, said face having a port therein and pockets which are contained in a margin which surrounds said port, the working face of said margin presenting a continuous surface which surrounds the port and is uninterrupted by said pockets, and a lubricant in solid form filling said pockets, said lubricant being flush with and forming a continuation of said working face.

2. A working face for a sliding valve, said face having a port therein and formed with pockets which are contained in a margin which surrounds the port between the edge of the port and the periphery of the face, said edge and periphery of the valve face being uninterrupted by said pockets, and a lubricant in solid form filling said pockets to a depth flush with said face.

3. A working face for a sliding valve, said face having grooves formed therein and extending obliquely relatively to the direction of motion of the valve, and a lubricant filling said grooves to a depth flush with said face.

4. A working face for a reciprocatory valve having sets of grooves inclined reversely relatively to the direction of reciprocation of the valve, and a lubricant filling said grooves to a depth flush with said face.

5. A working face for a reciprocatory valve having a port and grooves formed therein between said port and the periphery of the face, said grooves extending transversely of the direction of motion of the valve and having their ends adjacent to but set inwardly from the edge of the port and the periphery of the face, and a lubricant filling said grooves.

6. A working face for a reciprocatory valve having a port and sets of grooves of reverse pitches formed therein between the port and the periphery of the face, the margins of the face adjacent to the edge of the port and the periphery being continuous or ungrooved, and a lubricant in solid form filling said grooves.

In testimony whereof I have hereunto set my hand in presence of two subscribing witnesses.

LEIGH S. BACHE.

Witnesses:
L. V. ROUSSEAU,
CYRUS L. DU YEAUR.